Patented Oct. 25, 1932

1,884,563

UNITED STATES PATENT OFFICE

FRANCIS L. CARSON, OF SAN FRANCISCO, CALIFORNIA, ASSIGNOR TO THE PACIFIC LUMBER COMPANY, OF SAN FRANCISCO, CALIFORNIA, A CORPORATION OF MAINE

MANUFACTURE OF PRESSED OR FILTERED WOOD PRODUCTS

No Drawing. Application filed January 7, 1931. Serial No. 507,297.

The present invention relates to the manufacture of pressed or filtered wood board, sheets and shapes, from wood which has been shredded and, by mechanical means, into hair-like fiber. This invention has particular reference to processes wherein soluble soaps are used in connection with vegetable starch and metallic compounds to produce artificial boards, mats, sheets and shapes, having the properties of resiliency, plasticity, low thermal conductivity, high tensile strength, resistance to water, or moisture, as hereinafter more fully described.

I am aware that the specific raw materials which I use in my novel process have been used individually or in certain combination in the paper making industry prior to my invention, but insofar as I am aware, they have never been used in the combination and for the purposes hereinafter set forth; that is to say, that while it is quite common in the paper manufacture to use rosin size and the like in the beater engine, introducing the same for the purpose of waterproofing the paper, which is subsequently extracted in the form of pulp from the beater engine, I am not aware that it has been previously proposed to suspend raw shredded hair-like wood, wood bark, or other vegetable fiber, in a solution of colloidal starch and soap, which solution acts as a double medium of conveying the fibers and cementing the fibers together to produce artificial boards of high tensile strength and great resiliency, low thermal conductivity and springiness.

Briefly stated, my invention comprises the manufacture of artificial boards, sheets and shapes from raw shredded wood, in which process the individual hair-like fibers are cemented together by means of a vegetable starch. These soaps are applied to the fibers in the form of a solution containing vegetable starch. The combined or cemented fibers are waterproofed by treating the same with aluminum sulphate or its equivalent, whereby an insoluble metallic compound of the organic acid is produced on the matted fibers.

Shredded bark, such as that produced from these trees, commonly known as Sequoia, is ideal for my purpose. These trees are termed under the specific names of Washingtonia and Sempervirons and are particularly native to California, being mostly called redwood.

I have discovered that the bark of these trees lends itself admirably to a mechanical shredding action, whereby hair-like fiber is produced in various lengths from a maximum of three inches in length or longer to a fiber in the form of impalpable powder.

The hair-like fiber of the redwood bark mats readily when precipitated on a filter-plate from a solution of proper consistency, and this material may be used together with my binding agents, or may be used as a diluent and strengthening factor with other shredded woods which do not felt so readily.

The liquid binding agent, later described, acts as an ideal conveying and filtration medium for the shredded hair-like fiber which I describe.

Sodium and potassium, resinates, oleates and palmitates, are all plastic in character and are all water soluble, and materials formed with and cemented together by any of them will not hold shape under the action of moisture and temperature changes.

Wood and bark fibers, while they can be formed into mats or sheets by precipitating the same on screens from suitable solutions are in themselves, of insufficient strength to be of commercial value unless a substance of adhesive character is distributed throughout the body of the mats or sheets.

I find that vegetable starch acts as an adhesive and also as a strengthening, toughening and stiffening factor upon individual hair-like fibers of wood. In order to render the starch binding medium water-proof, I also provide an insoluble metallic soap which coats the starch on the fiber, with a moisture impervious film. I wish to point out that the said insoluble metallic soap acts also as an assistant to the starch in its binding function.

It is well known by those skilled in the art that through chemical reaction, insoluble metallic plasters may be produced from the sodium and potassium soaps when brought into contact with metallic sulphates and the like, for example:

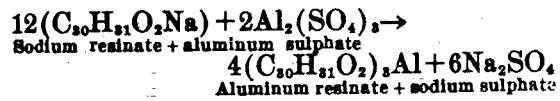
$$12(C_{20}H_{31}O_2Na) + 2Al_2(SO_4)_3 \rightarrow$$
Sodium resinate + aluminum sulphate
$$4(C_{20}H_{31}O_2)_3Al + 6Na_2SO_4$$
Aluminum resinate + sodium sulphate Also in like manner, sulphates of metals react with potassium resinate and with the sodium and potassium oleates and palmitates to form equivalent water insoluble soaps or plasters to that shown in the above outlined chemical equation.

It is common practice in the paper manufacturing art to introduce the soluble soaps into the solution containing the pulp and immediately thereafter, introduce alum to cause a reaction by precipitation of the insoluble material upon the pulp fiber. As a consequence, the entire conveying liquid solution becomes waste and the disposal problem is in consequence great and costly.

In order to dispense with the large waste water problem, I have devised a method whereby the raw fibers are conveyed to the screen of the board forming machine. The conveying solution comprises soluble soap and starch, and this solution is recovered from beneath the screen of the board forming machine and re-used in the process. As a subsequent step I treat the moist mat on the screen with an alum solution and recover the surplus alum solution as in the case of the conveying solution. While this alum solution is depleted in alum and contaminated with impurities, nevertheless the loss of alum may be replaced by freshly added quantities of the said alum and the impurities are such that no precipitation occurs until it has been re-used about seventeen times. At this point, the solution, by simple concentration of the old alum solution, will render the recovery of sodium sulphate possible.

I have discovered that it is possible to precipitate the insoluble plastic metallic soaps upon the hair-like fiber, making up my sheet or board after all surplus liquid has been filtered therefrom. By surplus I mean all the conveying solution which does not adhere to the hair-like fiber of the mat after filtration.

I have discovered that a mat or sheet, having been formed by felting from a solution of water, soluble soap and colloidal or semi-colloidal starch and left in a condition of a saturated mat upon the screen upon which it has been filtered, may then be subjected to the additional chemical reaction of rendering the contained binder insoluble in water in the following manner:

A solution of alum in water or a solution of alum in a colloidal starch solution may be filtered through the mat, and the soluble soap coating of each individual hair-like fiber is converted to an insoluble plaster or metallic soap thereon. This renders the separate hair-like particles of the mat upon subsequent drying of the moisture therefrom, highly moisture resistant.

I have discovered that mats or sheets such as I have described above are low in thermal conductivity and resilient to applied pressure, in that being slightly compressed and the pressure removed, the mats expand to the original volume occupied.

In the following specific examples the method of preparing the stock from which the artifical boards, sheets or shapes are made, is described. However, it is to be distinctly understood that I do not limit myself to the specific proportions set forth therein since my invention is of broad scope and the following examples are merely illustrative of a large number of modifications falling within the scope of the present invention. The parts are by weight.

*Example 1*

I make up a solution of water, sodium oleate, and starch, in a colloidal or semi-colloidal condition. The percentages are:

Water_____92 parts by weight.
Sodium resinate_____5 parts by weight.
Corn starch_____3 pounds by weight.

The usual methods are adopted for putting the corn starch into the solution, that of mixing the same into a paste with water, diluting and then heating to the boiling point under constant agitation—the sodium resinate being introduced into the heated liquid.

I next select shredded hair-like wood fiber having a fiber length up to three inches. This fiber is produced by subjecting redwood bark to a shredding operation in any conventional manner, the shredding operation per se forming no part of the present invention. I introduce about five pounds of this shredded fiber into 100 pounds of the foregoing mixture of soap and starch solutions and thoroughly mix the same to distribute the fibers throughout the entire colloidal mass. The thoroughly mixed mass is run onto a screen where the excess liquid drains off, or is sucked off by vacuum or forcing it through by an air or steam blast, leaving the mat of wood hair-like fibers saturated with the soap and starch solution. I then prepare a solution of aluminum sulphate by dissolving 1.6 ounces of salt in ten pounds of water. I then pour this solution on the saturated mat described above. However, it is preferable to introduce the alum solution onto the mat by means of a porous continuous belt disposed above the screen on two or more rolls, and adapted to contact the said mat. These rolls are adapted to move toward and from the screen. This arrangement of rolls and continuous belt provides means for supplying the mat with the alum solution at a low velocity, thereby preventing disruption of the mat. The aluminum soap coats the individual fibers of the board or sheet and renders the same water impervious.

*Example II*

I dissolve eight pounds of sodium resinate in water and make the solution up to one hundred pounds. In a separate container I make up a starch paste as in Example I, such that the solution contains 4 pounds of corn starch in 100 pounds of water. The solutions are combined as in Example I, and I introduce into the mixture about fifteen pounds of shredded redwood bark which has a fiber length of about one-half inch. I form a mat or sheet from this solution and waterproof the hair-like fiber the same as in Example I.

It is pointed out that the amount of soap may vary from one-half to twenty per cent of the combined solutions into which the shredded fibers are introduced. The amount of starch may vary from one-half to ten per cent. The amount used will depend on the degree of density and stiffness required in the final product and the mechanical compression, if any, to which the filtered mat or sheet may be subsequently subjected.

The moisture-proofed mat or sheet is dried and the product obtained according to Example I is resilient and springy, while that obtained by the procedure of Example II is by comparison, stiff and rigid and has considerable strength. Both products are extremely light in weight and are stable. The denser product made by Example II weighs about ten pounds per cubic foot has a thermal conductivity of 0.28 B. t. u. per one inch of thickness per degree Fahrenheit difference in temperature between the two sides (hot plate method).

It will be readily understood by those skilled in the art that the process of forming sheets or mats from the solution as outlined above, can be readily accomplished in a variety of ways. Almost any of the board making machines now on the market will lend itself to the expeditious and economical handling of this solution and the production of the finished product.

As to the product (sheet or mat) filtered from the solution as shown, by heating the mat containing aluminum resinate up to a uniform temperature of 250° Fahrenheit, and compressing the same under the mechanical action of rolls or presses, or both, I am able to form therefrom a stiff, rigid, dense product of high resistance to impact, abrasion, tension and compression, water-resistant and with extremely smooth surfaces, which is also capable of receiving applied finishes. This product has all the advantages of pressed wood pulp boards while being extremely inexpensive to produce. The preferred pressure is 400 pounds per square inch.

As used in the present specification and claims by the term "raw fibers", I mean vegetable fibers which have not been subjected to aqueous or chemical digestion or treatment of any kind.

What I claim is:—

1. The process of producing fibrous boards, sheets or shapes which comprises introducing shredded raw vegetable fibers into a solution containing soap and starch and forming a board, sheet or shape of any desired thickness.

2. The process of producing fibrous boards, sheets or shapes which comprises introducing shredded raw fibers into a solution containing an alkaline metal resinate and starch and forming a board, sheet or shape of any desired thickness.

3. The process of producing fibrous boards, sheets or shapes which comprises introducing shredded raw redwood fibers into a solution containing sodium resinate and starch and forming a board, sheet or shape of any desired thickness.

4. The process of producing fibrous boards, sheets or shapes which comprises introducing raw shredded wood fibers into a solution containing an alkaline metal salt of a resin acid and forming a board, sheet or shape of any desired thickness.

5. The process of producing fibrous boards, sheets or shapes which comprises introducing raw shredded redwood bark into a solution containing sodium resinate and starch and forming a board, sheet or shape of any desired thickness.

6. As a new article of manufacture, a unitary structure comprising shredded raw vegetable fibers cemented together by means of starch.

7. As a new article of manufacture, a board comprising shredded raw fibers cemented together by means of starch and a soap.

8. As a new article of manufacture, a sheet comprising shredded raw vegetable fibers cemented together by means of soap.

9. As a new article of manufacture, a unitary structure comprising shredded raw vegetable fibers cemented together by means of starch and containing an insoluble soap distributed throughout the mass.

10. As a new article of manufacture, a board comprising shredded raw vegetable fibers cemented together by means of a starch and containing soap distributed throughout the mass.

11. As a new article of manufacture, a resilient board comprising shredded redwood bark cemented together by means of starch and containing soap distributed throughout the mass.

12. As a new article of manufacture, a water-resistant resilient board comprising redwood bark fiber, produced by shredding and having a length of approximately three inches, cemented together by means of and having aluminum resinate distributed throughout the entire mass.

13. As an article of manufacture, a water resistant resilient board comprising raw redwood bark fiber produced by shredding and having a length up to three inches cemented together by means of starch and waterproofed by aluminum resinate.

14. As a new article of manufacture, a pressed board comprising raw vegetable fiber cemented together by means of starch and containing soap distributed throughout the mass, the said board having been compressed at a pressure of approximately 400 pounds and a temperature of 250° F.

15. The process of producing fibrous boards, sheets or shapes, comprising introducing shredded raw vegetable fibers into a solution containing soap and starch, forming a board, sheet or shape, recovering for re-use the excess solution, introducing an alum solution on the formed board, sheet or shape while in a moist state and recovering this solution for re-use.

16. In the process of producing fibrous boards, sheets or shapes from raw vegetable fibers, the step of recovering for re-use depleted alum solution.

In testimony whereof I affix my signature.

FRANCIS L. CARSON.